United States Patent [19]

Beausoleil et al.

[11] Patent Number: 4,716,546

[45] Date of Patent: Dec. 29, 1987

[54] MEMORY ORGANIZATION FOR VERTICAL AND HORIZONTAL VECTORS IN A RASTER SCAN DISPLAY SYSTEM

[75] Inventors: William F. Beausoleil, Hopewell Junction; David F. McManigal, Stormville, both of N.Y.

[73] Assignee: International Business Machines Corporation, Armonk, N.Y.

[21] Appl. No.: 890,662

[22] Filed: Jul. 30, 1986

[51] Int. Cl.⁴ .................................................. G06F 9/00

[52] U.S. Cl. ..................................... 364/900; 340/750

[58] Field of Search ........................ 364/200, 900, 521; 340/750, 709, 747, 720, 721, 727, 703

[56] References Cited

U.S. PATENT DOCUMENTS

| | | | |
|---|---|---|---|
| 3,883,728 | 5/1975 | Schwartz et al. | 235/152 |
| 4,145,754 | 3/1979 | Utzerath | 364/900 |
| 4,254,467 | 3/1981 | Davis et al. | 364/521 |
| 4,500,928 | 2/1985 | Bucek et al. | 358/296 |
| 4,546,451 | 10/1985 | Bruce | 364/900 |
| 4,559,611 | 12/1985 | Ostapko | 364/900 |

*Primary Examiner*—Gareth D. Shaw
*Assistant Examiner*—John G. Mills
*Attorney, Agent, or Firm*—William J. McGinnis, Jr.

[57] ABSTRACT

A memory organization for holding memory refresh data for a display uses input address selectors for memory modules for a segmented display to provide horizontal rotation of all data in the memory modules. On writing of vertical vectors, a logic tree using Exclusive ORs modifies memory address bits to provide tilt to the vertical vector and cause it to be orthogonal to horizontal vectors. Output data selectors read data from the memory modules to the display and derotate the data so that the display is restored to its original form.

5 Claims, 7 Drawing Figures

DESIRED VECTOR SEGMENTS

REPRESENTATION ARRAY

| | | | |
|---|---|---|---|
| A3 | B3 | C3 | D3 |
| A2 | B2 | C2 | D2 |
| A1 | B1 | C1 | D1 |
| A0 | B0 | C0 | D0 |

ACTUAL MEMORY ARRAY

| | | | |
|---|---|---|---|
| D3 | C3 | B3 | A3 |
| C2 | D2 | A2 | B2 |
| B1 | A1 | D1 | C1 |
| A0 | B0 | C0 | D0 |

OPTIMIZED MEMORY DATA

| | | | |
|---|---|---|---|
| | | B3 | |
| | | | B2 |
| B1 | | D1 | C1 |
| | B0 | | |

REFRESH DATA READOUT

| | | | |
|---|---|---|---|
| 0 | 1 | 0 | 0 |
| 0 | 1 | 0 | 0 |
| 0 | 1 | 1 | 1 |
| 0 | 1 | 0 | 0 |

MEMORY ORGANIZATION FOR VERTICAL AND HORIZONTAL VECTORS IN A RASTER SCAN DISPLAY SYSTEM

FIELD OF THE INVENTION

This invention relates to the memory refresh system used for display systems, such as cathode ray tubes (CRT), which must constantly be driven with information in order to maintain the display. In particular, the present invention is a display memory organization optimized for the writing and display of vectors, defined as straight lines from a first point to a second point on the display system. The refresh memory system according to the present invention is directed to a raster scan organization where the display is divided into picture elements (pixels) which are updated line by line.

BACKGROUND OF THE INVENTION

A typical display screen may be thought of as containing a grid consisting of rows and columns of pixels. The refresh memory used with such a system may be typically thought of as arranged in an addressable array of corresponding rows and columns with a memory location corresponding to each display pixel.

It has been found that for a display having a very large pixel grid, e.g. 1024×1024, a very high rate of memory operation is needed in order to provide the required refresh rate for a visually desirable display system. It has also been found that for a large number of display applications the display is primarily line segments which may be thought of as vectors and, in turn, that a substantial number of these vectors are either vertical or horizontal. In order to optimize the writing and refresh rate of a display, a significant consideration is the ability to write and refresh vertical and horizontal vectors. The standard display memory refresh organization allows for a sufficiently rapid horizontal vector read out but this same organization, by optimizing horizontal read out, imposes penalties on vertical writing and read out which make the writing of vertical vectors a limiting factor. Therefore, it would be desirable to have a memory organization which optimizes vertical vector writing and refresh to a rate comparable to that of horizontal vector writing and refresh.

To be more specific, computer graphics display devices which use the raster scan technique require a refresh memory comprising one or more data bits per pixel (picture element) to modulate the intensity of the display beam(s) while the required image is displayed repetitively in a manner similar to that used in the common television receiver. Because this intensity modulation data must be presented to the cathode ray tube in real time, very high data transmission speeds are required. For example, a 1024×1024 pixel display requires over one million bits of data per display frame to generate a binary monochrome picture. The minimum acceptable display rates are 30 FPS (frames per second) if display half-frames are interlaced, or 60 FPS for non-interlaced displays, requiring display rates of 30 or 60 megabits per second, respectively. Of course, displays providing multiple levels of intensity or multiple colors require much more beam modulation data in the same amount of time, resulting in data rates as high as 2.5 billion bits per second.

Because it is not desirable to support such transmission speeds in a serial fashion, refresh memories are invariably organized to provide parallel access to several data bits at a time, reducing the memory speed requirements to more practical dimensions. Thus, using conventional memory organization techniques, it is possible to read and/or write several bits in parallel in one refresh memory dimension, but access to several bits in the other dimension requires separate memory cycles.

Raster scan displays are refreshed in a consistent rectangular pattern, making parallel memory access usable for every refresh cycle. However, writing data into the refresh memory can require a separate memory cycle for every pixel of a vertical vector.

A vector generator may be produced which represents vectors at any angle as series of horizontal or vertical segments ("pixel runs") which are of uniform length and orientation for a given vector, except possibly the first and last segments of a vector. These segments may be produced by cycles of a vector/raster conversion device in a very short time (e.g., 70 ns per segment). However, conventional refresh memory organization would greatly degrade the speed advantages of such a technique for half of all the possible vector angles in a given implementation.

Vectors along the primary axis (usually horizontal) could be stored at the maximum rate permitted by the refresh memory; however, vectors between 45 and 135 degrees, or 225 and 315 degrees, would require a separate memory cycle for each pixel. Thus, parallel memory access would be of benefit in fewer than one-half of all possible vectors, and vertical vectors would operate at the lowest possible speed. Because most applications involve large numbers of vertical and horizontal vectors, this performance penalty can be very significant.

U.S. Pat. No. 4,559,611 assigned to the same assignee as the present invention deals with a memory mapping system having an adder for use with a raster scan memory refresh system. The system of this patent is adapted to writing vertical and horizontal vectors into the refresh memory so that no two adjacent vertical bits are written into the same memory chip. This patent has a comparatively high degree of computational complexity, however.

The system shown in the patent uses an adder to accomplish a memory reorganization by selectively changing address bits for vertical bits on writing into the memory. An adder is logically complicated and has a built in delay because of the need to wait for carry propagation. Thus, the use of an adder for a memory organization scheme is not as efficient as would be desirable for speeding up the vector writing function.

U.S. Pat. No. 4,500,928 also assigned to the same assignee as the present assignee, provides additional background information on display writing and refresh systems.

However, there remains a need for a display write and refresh memory system utilizing a high speed and efficient logic system with a comparatively low degree of computational complexity.

SUMMARY OF THE INVENTION

The present invention is a memory organization system for a display memory. The memory is organized with computationally efficient logic to facilitate the writing into memory of both horizontal and vertical vectors at the same rate while allowing normal refresh of the display.

The organization of the invention is based on dividing the display into small, square pixel groups for addressing. While the pixel groups are optimally square, the entire display does not need to be square. Thus, for example, the display may be 1024×1024 pixels taken in 4×4 pixel groups for 256×256 memory segments. The embodiment shown here is based on an organization of 4×4 pixel groups. Each memory segment thus consists of four memory modules in which the 4×4 pixel pattern is stored in reorganized form so that vertically adjacent memory cells are not addressed on consecutive cycles of memory. The invention is not limited to this embodiment but includes the scope of memory cell reorganization at any power of two. Hence, an 8×8 cell structure or a 16×16 cell structure may be used and so forth.

Each memory segment according to the present invention is organized in a rotated or wrap-around fashion so that vertically adjacent pixels are not stored in vertically adjacent memory locations in each memory segment. As the display is read, each segment is addressed separately and produces its memory output simultaneously for inclusion in a raster-scan line. For writing horizontal vectors, the memory modules are addressed in the same rotated or wrap-around fashion in which they are read. For writing vertical vectors, the memory modules are addressed in a vertical fashion and the vertical vector is written into memory in a rotated and tilted or skewed fashion so that vertically adjacent memory positions are not consecutively addressed.

A scheme of memory selectors for writing into each group of memory modules is combined with a separate group of memory selectors for reading out of each memory module. The selectors are addressed for both reading and writing so that rotation automatically occurs on writing and derotation occurs on reading. Memory address modification or alteration logic changes the addressing scheme during input of a vertical vector by causing a tilt in the address organization which offsets for the automatic rotation. Vertical vectors are written orthogonally to horizontal vectors in memory. Thus, when the address selectors rotate as data is read out of the memory segment, the vertical vector is recreated. It is important to understand that the same display pixel corresponds to the same memory location whether it is part of a horizontal segment or a vertical segment and regardless of whether a read or write operation occurs.

The memory modification logic consists of a conditioning tree of ANDs and ORs connected to an EX OR (Exclusive OR) arrangement that adjusts the writing of vertical vectors in the memory array with a tilt to correspond or compensate to the rotation with which the module will be read during refresh.

This invention provides optimum memory access for both vertical and horizontal vectors. This produces an overall performance improvement that approaches one-half the refresh memory word length in bits, assuming equal proportions of vertical and horizontal vectors in a display application. That is, a refresh memory word length of 16 bits would produce nearly an eight-fold performance improvement with this invention.

The basic principle involved is to rotate the memory addressing axes by 45 degrees. This places 45 degree display vectors on the worst-case vertical memory axis, so they still require one access per pixel, and are not improved. However, it places both vertical and horizontal display vectors along the 45 degree memory axis, so they result in equal memory accesses. Vector segment bits always lie in different memory word bit positions, permitting parallel memory access for all vector segments.

The circuitry required to rotate the memory axes in the fashion just described for a complete memory corresponding to a complete display is prohibitively complex. However, the rotation principle can be applied within small domains, using relatively simple circuits to transform memory addresses on a per-bit basis, while simultaneously routing vector segment data bits to appropriate memory data word positions. This "psuedo-rotation" is done only within a limited memory domain, rather than across the full memory, thus simplifying the required controls, while accomplishing the objective of placing sequential bits of any possible vertical or horizontal vector segment in different bit positions within the memory word.

DESCRIPTION OF THE PREFERRED EMBODIMENT

Figure 1A:
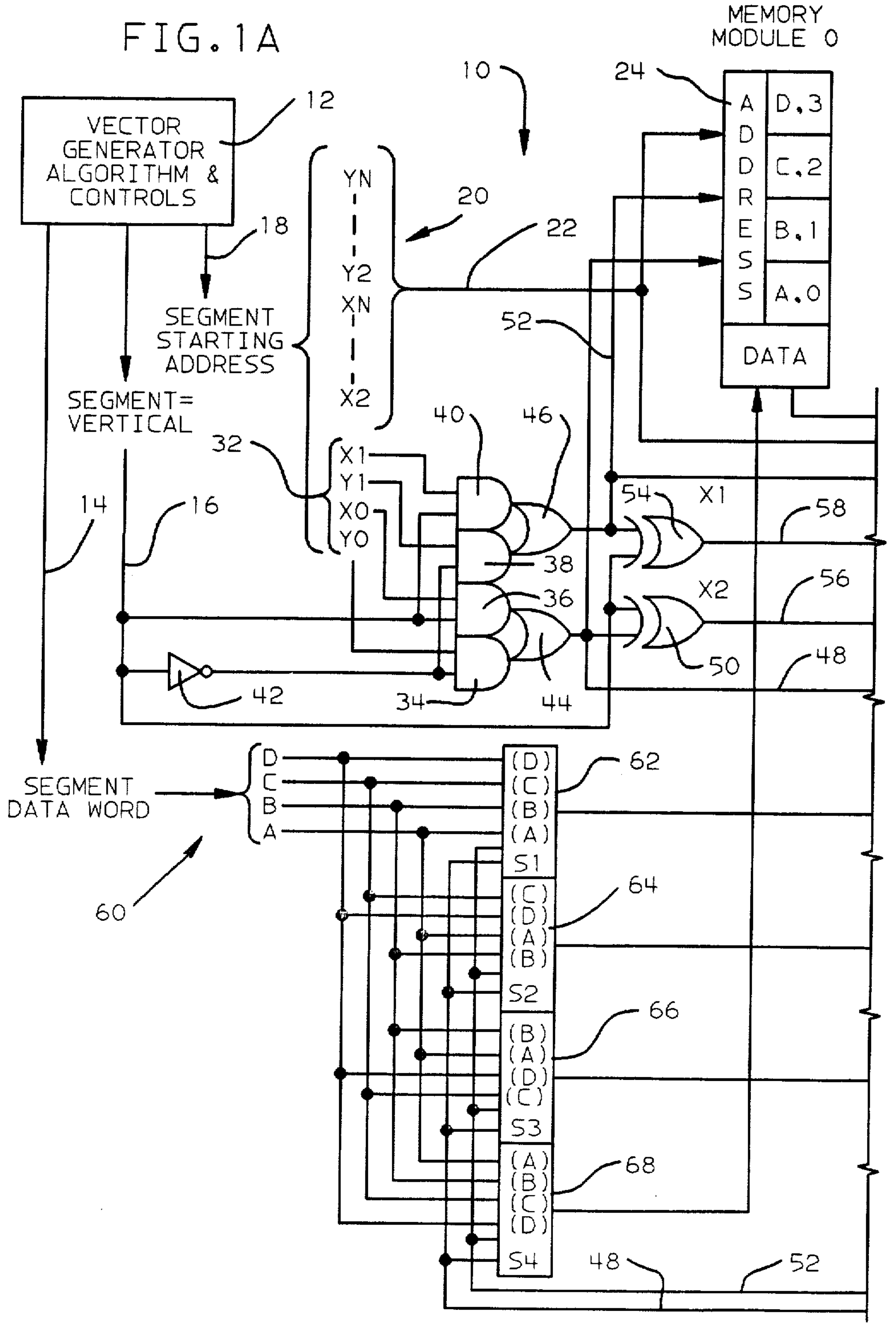
FIGS. 1A and 1B are in left to right order, are a schematic diagram of a single memory segment of a display memory according to the present invention.
Figure 1B:
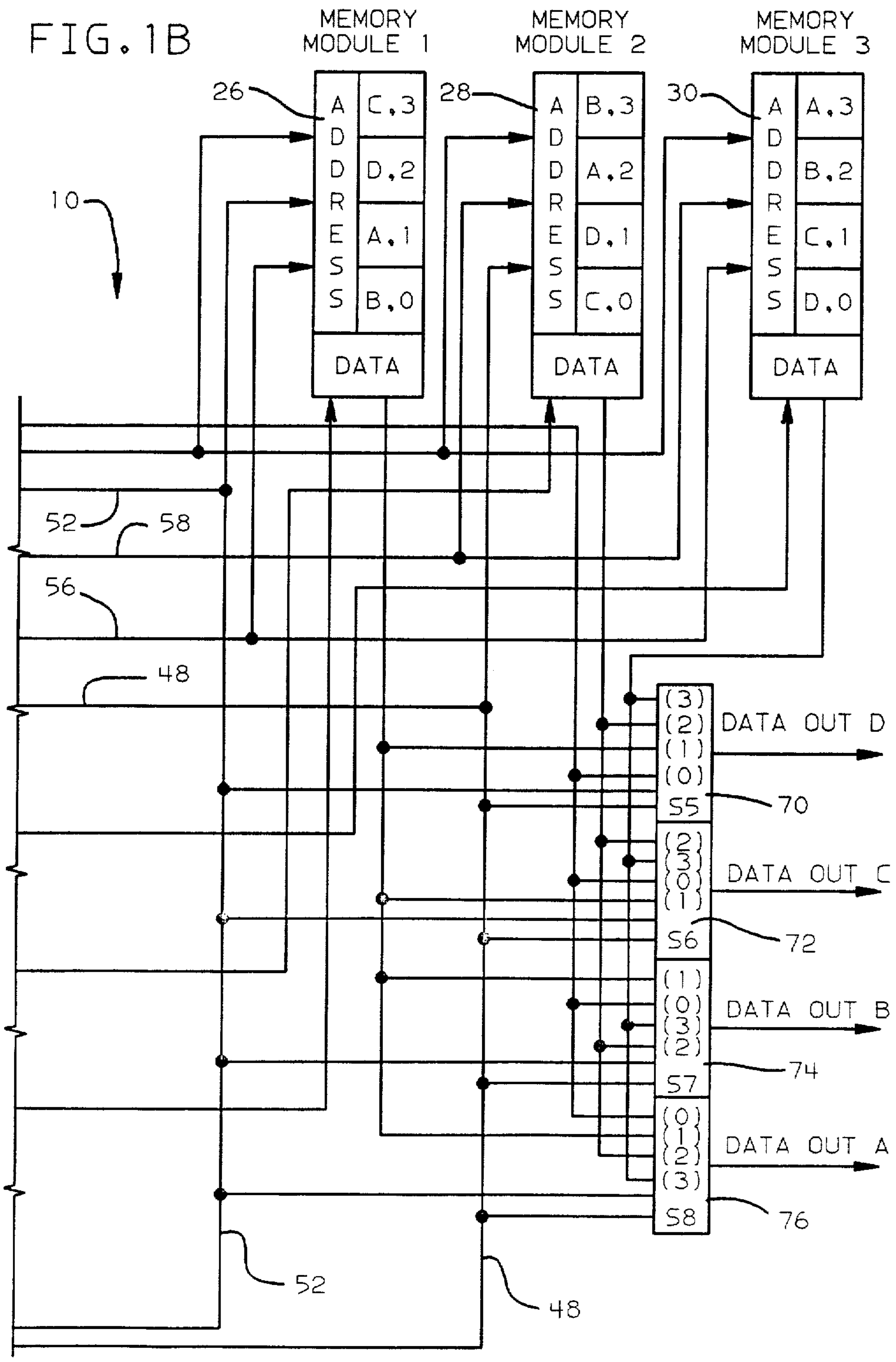

Referring now to FIGS. 1A and 1B, a memory system 10 according to the present invention is shown in diagrammatic form. A display of M×N pixels is driven by a plurality of identical P×P group or segment drivers. For example, a 1024×1024 pixel display may be driven by a plurality of 4×4 pixel group drivers, where P specifies the group dimension and may be any power of 2 such as 4, 8, 16, etc. System 10, as shown in FIGS. 1A and 1B is a single 4×4 group driver for a display where the other group drivers are identical. The general concept of dividing a display into groups or segments of pixels for faster display refresh is known in the art and therefore the complete details of such a system will not be described here.

A vector generator algorithm and controls system 12, hereafter referred to as just vector generator 12, receives input information for generating vectors, for example, from operator instructions, and generates the required output for the display memory. Such devices are generally known and will not be described further here.

The vector generator 12 is required to produce three outputs, a data output consisting of a segment data word is provided on line 14, a trigger line 16 carries a control signal to indicate that a vertical vector is being written and to activate the system of the present invention for writing vertical vectors and a segment starting address line 18. Thus, the vector generator 12 produces a starting address, data bits for the pixels and a trigger signal to invoke the special vertical vector handling system of the invention.

The address signals from the vector generation are combined with all other address signals as shown diagrammatically at 20 to provide address signals to the four memory modules of this segment as well as all other memory modules in the display. The highest order memory address bits are shown connected on line 22 to memory modules 24, 26, 28 and 30; representing modules 0, 1, 2 and 3 of this segment, respectively. In addition, these high order address bits are appropriately connected to all other modules of all other segments in the display and provide address selection of the modules and segments for scanning the display. The lowest order four bits of the address X0, Y0, X1, Y1, are shown separately at 32 representing the bits necessary to provide addressing to individual memory cells in an array representing a 4×4 pixel display segment.

The address lines at 32 are connected to AND gates 34, 36, 38 and 40 for address lines Y0, X0, Y1 and X1, respectively. A second input to AND gates 34 and 38 is provided by the vertical segment trigger line 16 connected through inverter 42 to provide the inverted condition of the trigger line as an input. A second input to AND gates 36 and 40 is provided by the direct input of vertical segment trigger line 16. The outputs of AND gates 34 and 36 are connected to OR gate 44 while the outputs of AND gates 38 and 40 are connected to OR gate 46.

The output of OR gate 44 is connected on address line 48 to memory modules 24 and 28 and also to an Exclusive OR gate 50. The output of OR gate 46 is connected on address line 52 to memory modules 24 and 26 and also to an Exclusive OR gate 54.

The output of Exclusive OR 50 is connected on an address line 56 to memory modules 26 and 30. The output of Exclusive OR 54 is connected on an address line 58 to memory modules 28 and 30.

The logic tree consisting of AND gates 34, 36, 38 and 40, OR gates 44 and 46 and Exclusive OR gates 50 and 54 serves to provide unaltered address bits to the memory modules for all read operations and for horizontal vector write operations. For vertical vector write operations this logic tree provides a stepwise altering of memory module addresses equivalent to writing the vertical vector at a tilt in the memory modules and orthogonally to horizontal vectors.

If the display segment sizes were to be different than the 4×4 scheme shown here, such as 8×8 for example, the number of low order address lines implemented in a logic tree according to the present invention would be increased. In an 8×8 display segment there would be eight memory modules. Three low order address lines would be adjusted using three Exclusive OR gates backed by the necessary AND and OR gates in a logic tree to provide stepwise or tilted adjustment of address locations for vertical vectors during writing.

The segment data word from line 14 of vector generator 12 is combined with other input data words at 60 to represent data words A, B, C and D representing pixels in left to right order in the display. The data words are connected to selectors 62, 64, 66 and 68 which select which memory modules are to receive which data words. Memory address lines 48 and 52 are connected to each of selectors 62, 64, 66 and 68 to control the placement of the data words in the memory modules. Selectors 62, 64, 66 and 68 may be standard selector parts generally available as for example, standard type number SN74157 as a catalog semiconductor chip. Selector 62 is connected to provide its data output to memory module 30, selector 64 is connected to module 28, selector 66 is connected to module 26, and selector 68 is connected to module 24.

Selectors 62, 64, 66 and 68 rearrange the input data words A, B, C and D so that for each raster-scan line in the display segment the location of the data word is rotated in a wrap-around fashion. Thus, the bottom line in the segment is stored in the modules in A, B, C, D order, the second B, A, D, C order, the third in C, D, A, B order, and the fourth in D, C, B, A order.

If address line 48 is treated as address line A and address line 52 is treated as address line B, then selectors 62, 64, 66 and 68 provide outputs to the memory modules as labeled in FIGURE 1A according to the following Table I:

TABLE I

BA=00
BA=01
BA=10
BA=11

The selectors 62, 64, 66 and 68 provide a rotation to all data written into memory modules 24, 26, 28 and 30. Thus, both horizontal and vertical vectors are rotated on writing. This rotation is consistent with the intention that no two consecutive scan lines have to address vertically adjacent memory columns. In addition, vertical vectors are written in altered address locations to represent a tilt of the vector, again, so that information for vertically adjacent pixels is not written in vertically adjacent memory columns. The output of Exclusive ORs 50 and 54 on address lines 56 and 58, respectively, represents the inverted normal value of the particular address bit during writing of a vertical vector segment. Address lines 48 and 52 retain their original values during vertical vector segment writing.

The organization of the selectors for wrap-around or rotational addressing and the address adjustment for vertical vectors is consistent with the principle that the same display pixel has the same memory location whether it is part of a horizontal segment or a vertical segment. This is because the horizontal wrap-around occurs in one direction while the vertical tilt occurs in the opposite direction and is equivalent to writing a vertical vector at a 45 degree angle.

Address lines 48 and 52 are also connected to output selectors 70, 72, 74 and 76 which are similar to the input selectors. The output selectors 70, 72, 74 and 76 are connected to receive data from the memory modules 24, 26, 28 and 30 during memory read operations for the display refresh cycle. The output selectors read data from the indicated memory module locations according to the same selection Table I as is used for writing to provide restored data on output lines A, B, C and D. For horizontal vectors which were rotated upon writing, the output selection process is a normalizing or derotating process that results in a horizontal vector being provided to the display in the same fashion in which it was written. For vertical vectors, the output selection process represents both a derotating and a detilting or deskewing process that results in a vertical vector appearing correctly on the display.

Figures 2A, 2B, 2C, 2D, 2E:
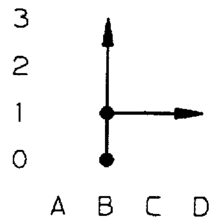
FIG. 2A is a representation of line segments in a display to be written into the memory segment of FIGS. 1A and 1B.
FIG. 2B is a diagram of an array organization corresponding to the pixel display organization of FIG. 2A.
FIG. 2C. is a diagram of how the memory modules of FIGS. 1A and 1B are actually addressed according to the present invention.
FIG. 2D is a diagram of the written memory locations of the module of FIG. 2C in order to represent the display of FIG. 2A.
FIG. 2E is a representation of the data as actually read out of the memory segment of FIGS. 1A and 1B to represent the display of FIG. 2A.

Referring now to FIG. 2A, an illustrative example is provided for a horizontal vector occupying spaces B, C and D on raster line 1 of the display and a vertical vector occupying space B on raster lines 0, 1, 2 and 3 of the display. FIG. 2B represents the theoretical locations of data storage elements in a memory array to match the pixel locations of FIG. 2A. The memory modules and selectors of FIGS. 1A and 1B are labeled according to this scheme. FIG. 2C shows the way in which selectors 62, 64, 66 and 68 actually address memory modules 24, 26, 28 and 30 to create the wrap around or rotational effect. FIG. 2D shows the written memory locations corresponding to storing the display of FIG. 2A. Finally, FIG. 2E represents the refresh data readout from memory by selectors 70, 72, 74 and 76 with derotates and deskews the data to recreate the actual desired display.

While the memory organization system of this invention has been shown by an example using 4×4 display segments, any square memory segment that is a power of 2 such as 8×8, 16×16 etc. may be used. The 4×4 memory organization is easy to show diagrammatically and provides the optimum combination of memory refresh speed and segment addressing simplicity.

To summarize, the Exclusive OR circuits, 50 and 54, provide memory address transformation for vertical vectors, thus maintaining segment orthogonally. The data selectors, 62 through 68, swap data bit positions for both horizontal and vertical segments to place segment bits in different independently addressable memory modules (chips, cards, etc.). The inverse of this bit swapping algorithm is applied to memory output data by selectors 70 through 76.

In operation, the vector generator 12 produces a vector segment defined by a starting X, Y position (least X, Least Y for the segment) and a data word comprising one bit for each column within the addressed memory domain. The memory domains are square, N-bits by N-bits, where N is the number of bits in a memory word, and they are positioned on modulo-N address boundaries. N must be an integer power of 2.

The vector generator also provides a signal on line 16 indicating whether the segment is oriented horizontally or vertically. Note that all vector segments for any given vector will be oriented in the same direction, and that direction will be along the axis having the greater displacement (delta X/Y). In the special case of 45 degree vectors, the direction is irrelevant.

The high order bits of the starting Y value provide the high order word address bits for the memory, and the high order bits of the starting X value provide the low order word address. The low order bits of each address are used as shown. This scheme may be extended to any 2**N word length by continuing the binary counting scheme of true/inverted connections shown in FIGURE 1A.

Data bit positioning is accomplished via the data selectors, which select one of N data lines depending on the binary values applied to select terminals 48 and 52. This results in the data bit positions shown in each memory module 24, 26, 28 and 30, as I, J, where I is the source bit position and J is the relative address within the memory.

While the invention has been particularly shown and described with plural embodiments thereof, it will be understood by those skilled in the art that various changes in form and details may be made therein without departing from the spirit and scope of the invention.

Having thus described our invention, what we claim as new, and desire to secure by Letters Patent is:

1. A memory organization for a raster-scan display refresh memory organized in square pixel groups organized in memory segments consisting of physically separate memory modules for separate portions of pixel groups where high order address bits select modules and low order address bits select within modules, comprising:

a memory segment for an N×N pixel display area where N is a power of two and wherein the memory segment contains N physically separate addressable memory modules, memory address generating means for addressing each of said memory modules with data, said memory address means having the highest order address bits thereof connected directly to the address inputs of each of said memory modules, vector generating means for producing display vectors connected to said memory address generating means and for producing an output control signal when a vertical vector is generated and sent to said memory address generating means, input data selector means (62,64,66,68) for receiving input data and said low order address bits for said data and for providing said data to said memory modules in a rotated form representative of a wrap-around rearrangement of raster-scan lines, memory address transforming means connected to said memory address generating means and said vector generating means for receiving said low order bits of said memory address and said vertical vector control signal and consisting of a logic tree having Exclusive OR gate means as outputs for providing unchanged rotated addresses to said memory modules in the absence of said vertical vector control signal and for providing tilted memory addresses for vertical vectors by changing address bit values in the presence of said vertical vector control signal to write vertical vectors into said memory modules orthogonally to horizontal vectors, and memory output data selector means (70,72,74,76) connected to receive data from said memory modules for derotating memory data as it is read out of memory to a display refresh cycle by restoring the data to a raster-scan display arrangement from the arrangement in which it was stored in memory.

2. The memory organization of claim 1 wherein N is 4 so as to require four memory modules for a 4×4 pixel display area for each memory segment.

3. The memory organization of claim 1 wherein said memory address transforming means receives all of the low order address bits for the particular memory segment and said Exclusive OR gate means inverts the memory address bits selectively for the selected order memory module of said segment during writing of vertical vectors.

4. The memory organization of claim 3 wherein N is 4 so as to require four memory modules for a 4×4 pixel display area for each memory segment and including two Exclusive OR gate means for memory address transformation.

5. The memory organization of claim 1 wherein the number of Exclusive OR gate means for address transformation is the same as the number of low order address lines required to transform the address of the memory modules of the memory segment.

* * * * *